United States Patent [19]

Lindstedt

[11] Patent Number: 4,866,934
[45] Date of Patent: Sep. 19, 1989

[54] MARINE DRIVE EXHAUST SYSTEM WITH SHAPED O-RING SEALS

[75] Inventor: Dennis H. Lindstedt, Winneconne, Wis.

[73] Assignee: Brunswick Corporation, Skokie, Ill.

[21] Appl. No.: 295,898

[22] Filed: Jan. 11, 1989

[51] Int. Cl.⁴ .............................................. F01N 3/04
[52] U.S. Cl. ....................................... 60/321; 60/320; 60/323; 277/167.5; 285/41
[58] Field of Search ..................... 60/321, 323, 320; 285/41; 277/167.5

[56] References Cited

U.S. PATENT DOCUMENTS

| | | | |
|---|---|---|---|
| 613,053 | 10/1898 | Bates | 277/167.5 |
| 3,798,904 | 3/1974 | Gleason | 285/41 |
| 4,573,318 | 3/1986 | Entringer et al. | |
| 4,707,986 | 11/1987 | Takada | 60/321 |

OTHER PUBLICATIONS

Mercury Marine Mercruiser 420, Parts Catalog 90-16286, 1987, pp. 16 and 17.

*Primary Examiner*—Douglas Hart
*Attorney, Agent, or Firm*—Andrus, Sceales, Starke & Sawall

[57] ABSTRACT

A marine drive exhaust system (10, 12, 14) is provided with resilient, shaped rubber O-ring seals (20, 74) between facing surfaces (16, 18) of the exhaust manifold (10) and exhaust elbow (12), and the facing surfaces (70, 72) of the exhaust elbow (12) and the exhaust pipe (14). Each of the shaped O-ring seals has an inner peripheral rib (22, 76) extending peripherally around the exhaust passage and generally conforming to the shape thereof and being spaced laterally between the exhaust passage and the peripheral water passages. Each of the shaped O-ring seals has an outer peripheral rib (28, 82) extending peripherally around the water passages and spaced laterally outward of the inner rib by a gap (30, 84) through which the water passages extend.

41 Claims, 2 Drawing Sheets

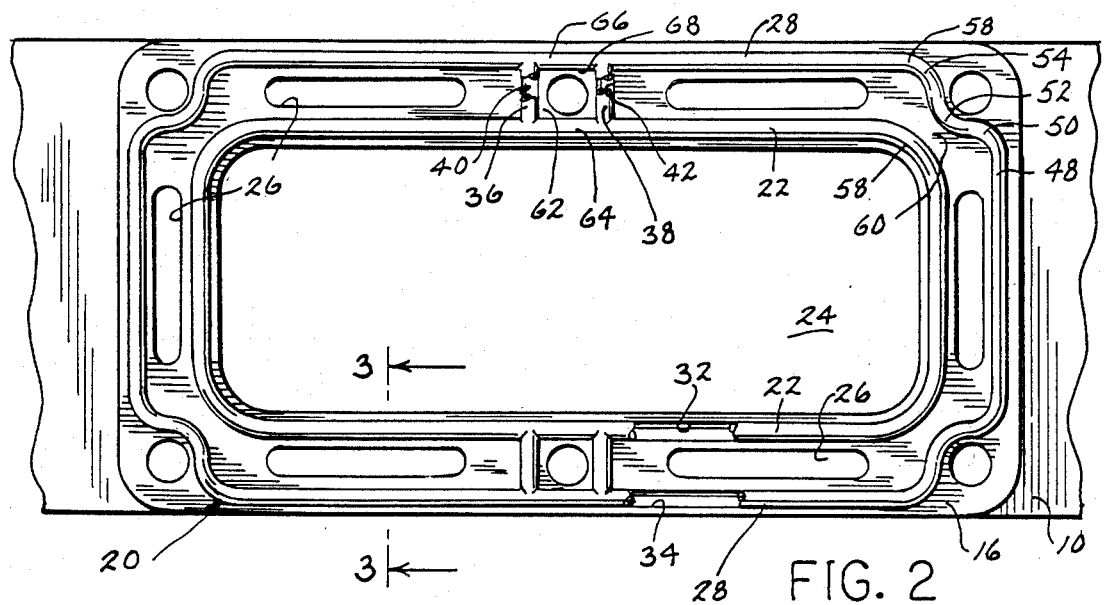

MARINE DRIVE EXHAUST SYSTEM WITH SHAPED O-RING SEALS

BACKGROUND AND SUMMARY

The invention relates to marine drive exhaust systems, and more particularly to interfacing seals therein preventing leakage of water and exhaust gas.

In a marine stern drive, for example a Mercury Marine Mercruiser 420, Parts Catalog 90-16286, 1987, pages 16 and 17, an exhaust pipe is mounted to an exhaust elbow which in turn is mounted to an exhaust manifold, and each has a central passage surrounded by a plurality of peripheral water passages for cooling exhaust gas in the exhaust passage. The exhaust elbow inlet is bolted to the exhaust manifold at mating facing surfaces, with a gasket therebetween to seal same. The exhaust pipe is bolted to the exhaust elbow outlet at mating facing surfaces, with a gasket therebetween to seal same. Prior systems have experienced problems with leaking gaskets. Such leakage causes rust and corrosion of the parts, and is unsightly.

The present invention addresses and solves the noted leakage problem in a particularly simple and effective manner. A tight seal is provided between the noted facing surfaces. A shaped O-ring seal has an inner peripheral rib extending peripherally around the exhaust passage and generally conforming to the shape passage and the water passages. The shaped O-ring seal has an outer peripheral rib extending peripherally around the water passages and spaced laterally outward of the inner rib by a gap through which the water passages extend.

BRIEF DESCRIPTION OF THE DRAWINGS

FIG. 2 is a top view of the outlet of the exhaust manifold of FIG. 1.

FIG. 3 is a sectional view taken along line 3—3 of FIG. 2.

FIG. 4 is an end view of the outlet of the exhaust elbow of FIG. 1.

DETAILED DESCRIPTIONS

Figure 1:
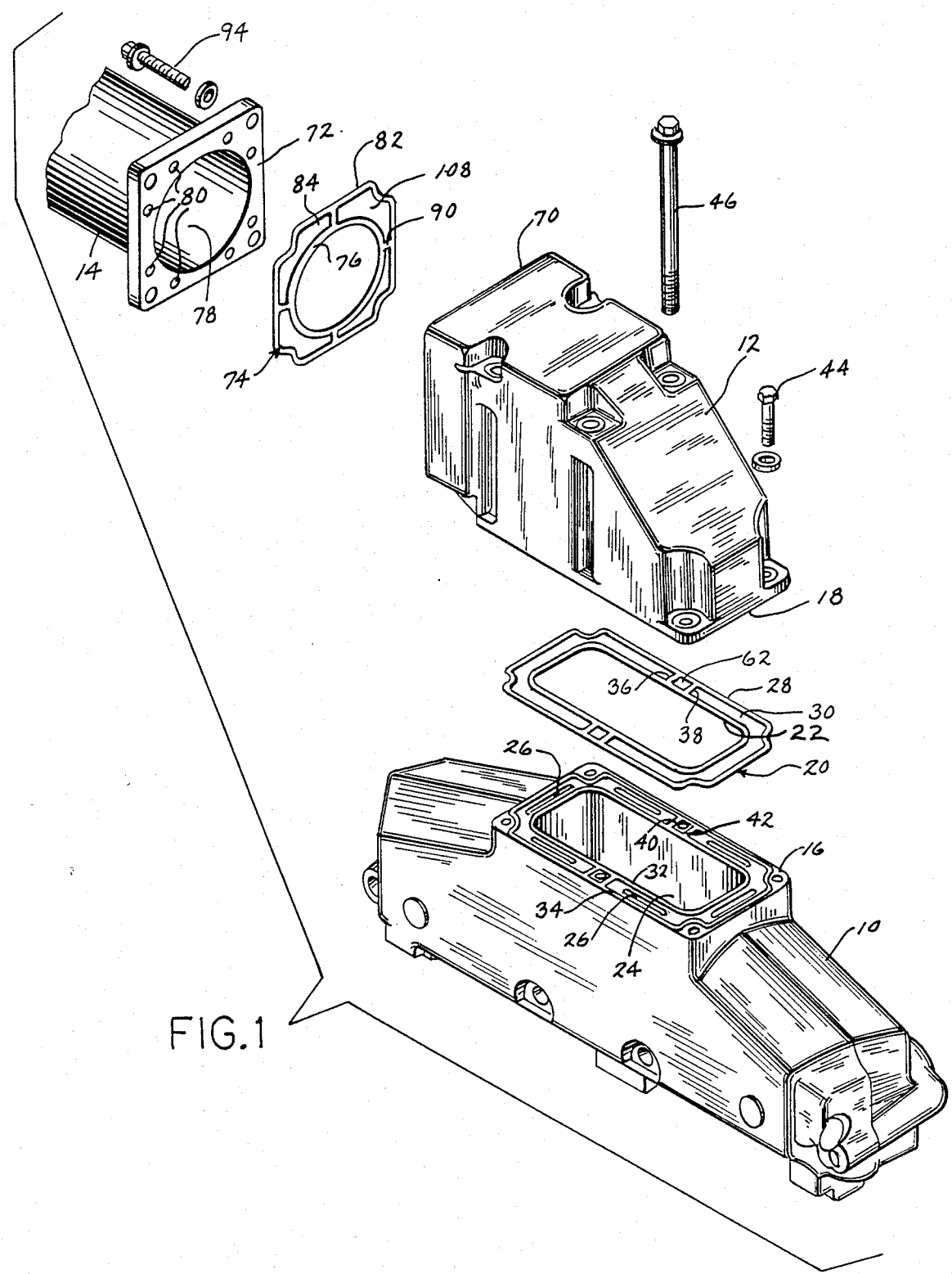
FIG. 1 is an exploded perspective view of a marine drive exhaust system in accordance with the invention.

FIG. 1 shows a marine drive exhaust system similar to that shown on page 16 of the above noted Mercury Marine Parts Catalog, but modified in accordance with the invention. The marine drive includes an exhaust manifold 10, an exhaust elbow 12, and an exhaust pipe 14, each of which has a central exhaust passage surrounded by a plurality of peripheral water passages for cooling exhaust gas in the exhaust passage, for which further reference may be had to the above noted Mercury Marine Parts Catalog, and to Entringer et al. U.S. Pat. No. 4,573,318, incorporated herein by reference. Exhaust manifold 10 and exhaust elbow 12 have facing surfaces 16 and 18 mating with each other.

A resilient, shaped rubber O-ring seal 20 is provided between facing surfaces 16 and 18. Shaped O-ring seal 20 has an inner peripheral rib 22 extending peripherally around exhaust passage 24 and generally conforming to the shape thereof and being spaced laterally between exhaust passage 24 and water passages 26, FIGS. 1 and 2. Shaped O-ring seal 20 has an outer peripheral rib 28 extending peripherally around water passages 26 and is spaced laterally outward of inner rib 22 by a gap 30 through which the water passages from manifold 10 to elbow 12 extend. Facing surface 16 of exhaust manifold 10 has an inner groove 32 extending peripherally around exhaust passage 24 and generally conforming to the shape of and receiving inner rib 22 of shaped O-ring seal 20. Facing surface 16 has an outer groove 34 extending peripherally around water passages 26 and generally conforming to the shape of and receiving outer rib 28 of shaped O-ring seal 20 therein. Ribs 22 and 28, extend upwardly beyond respective grooves 32 and 34, FIG. 3, and are squished downwardly and deformed upon mating of facing surfaces 18 and 16 of exhaust elbow 12 and exhaust manifold 10, respectively, to form a tight seal therebetween and isolate water between inner and outer ribs 22 and 28.

Shaped O-ring seal 20 includes cross-ribs 36 and 38 extending integrally between inner and outer ribs 22 and 28 to support one from the other as a unitary member for placement in grooves 32 and 34. Cross-grooves 40 and 42 in facing surface 16 extend between inner and outer grooves 32 and 34 and generally conform to and receive respective cross-ribs 36 and 38 therein.

Exhaust elbow 12 is mounted to exhaust manifold 10 by a set of bolts extending through facing surfaces 18 and 16. The set includes a first subset of four bolts such as a 44 at the corners, and a second subset of two bolts such as 46 between the corners. Outer rib 28 of shaped O-ring seal 20 is shaped to extend laterally inwardly of corner bolts 44 to direct and limit water flow at facing surfaces 16 and 18 along a path laterally inwardly of bolts 44 to isolate such bolts from water in the water passages. Corner bolts 44 are generally peripherally aligned with peripheral water passages 26, and outer rib 28 at the corners is curved to extend laterally inwardly of each of respective bolts 44. Outer rib 28 has a portion 48, FIG. 2, extending toward the respective bolt 44, a portion 50 extending from portion 48 and convexly curved adjacent the bolt, a portion 52 extending from portion 50 and concavely curved adjacent the bolt, a portion 54 extending from portion 52 and convexly curved adjacent the bolt, and a portion 56 extending from portion 54 and away from the bolt. Inner rib 22 has a convexly curved portion 58 opposite the bolt. Portion 52 of outer rib 28 curves concavely inwardly toward convexly curved portion 58 of inner rib 22. Convexly curved portion 58 of inner rib 22 and concavely curved portion 52 of outer rib 28 are spaced by a lateral gap 60 therebetween communicating with the water passages on both peripheral sides thereof. Portions 48 and 56 of outer rib 28 extend generally at right angles to each other.

The second subset of bolts 46 are generally peripherally aligned with peripheral water passages 26. One pair of cross-ribs 36, 38 is provided for each mid-bolt 46. Cross-ribs 36 and 38 are spaced by a gap 62 therebetween receiving the respective mid-bolt 46 and surrounding such bolt to isolate the bolt from water in water passages 26. Inner and outer ribs 22 and 28 at mid-portions 64 and 66 extend substantially straight and parallel to each other at the respective mid-bolt 46 and on opposite lateral sides thereof. Cross-ribs 36 and 38 extend substantially straight and parallel to each other and substantially at right angles to inner and outer ribs 22 and 28 at mid-portions 64 and 66, such that inner and outer ribs 22 and 28 and cross-ribs 36 and 38 form a substantially rectangular shaped enclosure 68 around respective mid-bolt 46.

Exhaust elbow 12 and exhaust pipe 14 have respective facing surfaces 70 and 72 mating with each other. A resilient, shaped rubber O-ring seal 74 is provided between facing surfaces 70 and 72. Shaped O-ring seal 74 has an inner peripheral rib 76 extending peripherally around exhaust passage 78, and generally conforms to the shape thereof and is spaced laterally between exhaust passage 78 and peripheral water passages 80. Shaped O-ring seal 74 has an outer peripheral rib 82 extending peripherally around water passages 80 and is spaced laterally outward of inner rib 76 by a gap 84 through which the water passages from elbow 12 to exhaust pipe 14 extend.

Facing surface 70 of exhaust elbow 12 has an inner groove 86, FIG. 4, formed therein and extending peripherally around exhaust passage 78a and generally conforming to the shape of and receiving inner rib 76 of shaped O-ring seal 74 therein. An outer groove 88 in facing surface 70 extends peripherally around water passages 80a and generally conforms to the shape of and receives outer rib 82 of shaped O-ring seal 74 therein. Ribs 76 and 82 extend beyond respective grooves 86 and 88, comparably to ribs 22 and 28 as shown in FIG. 3, and are squished and deformed upon mating of facing surfaces 72 and 70 to form a tight seal therebetween and isolate water between inner and outer ribs 76 and 82.

Shaped O-ring seal 74 includes cross-ribs 90 extending integrally between inner and outer ribs 76 and 82 to support one from the other as a unitary member for placement in grooves 86 and 88. Cross-grooves 92 in face surface 70 extend between inner and outer grooves 86 and 88 and generally conform to and receive a respective cross-rib 90 therein.

Exhaust pipe 14 is mounted to exhaust elbow 12 by a plurality of corner bolts such as 94 extending through facing surfaces 72 and 70. Outer rib 82 of shaped O-ring seal 74 is shaped to extend laterally inwardly of corner bolts 94 to direct and limit water flow at facing surfaces 70 and 72 along a path laterally inward of bolts 94 to isolate such bolts from water in the water passages. Bolts 94 are generally peripherally aligned with peripheral water passages 80. Outer rib 82 is curved to extend laterally inwardly of each respective bolt 94. Outer rib 82, at each bolt 94, has a portion 96, FIG. 4, extending toward the respective bolt, a portion 98 extending from portion 96 and convexly curved adjacent the bolt, a portion 100 extending from portion 98 and concavely curved adjacent the bolt, a portion 102 extending from portion 100 and convexly curved adjacent the bolt, and a portion 104 extending from portion 102 and away from the bolt. Inner rib 76 at portion 106 opposite the respective corner bolt 94 curves toward such bolt. Portion 100 of outer rib 82 curves concavely inwardly toward curved portion 106 of inner rib 76. Curved portion 106 of inner rib 76 and concavely curved portion 100 of outer rib 82 are spaced by a lateral gap 108 therebetween communicating with the water passages as water flows from passages 80a to passages 80. Portions 96 and 104 of outer rib 82 extend generally at right angles to each other.

It is recognized that various equivalents, alternatives and modifications are possible within the scope of the appended claims.

I claim:

1. In a marine drive having an exhaust manifold and an exhaust elbow each having a central exhaust passage surrounded by a plurality of peripheral water passages for cooling exhaust gas in said exhaust passage, said exhaust manifold and said exhaust elbow having facing surfaces mating with each other, a resilient, shaped O-ring seal between said facing surfaces, said shaped O-ring seal having and inner peripheral rib extending peripherally around said exhaust passage and generally conforming to the shape thereof and being spaced laterally between said exhaust passage and said water passages, said shaped O-ring seal having an outer peripheral rib extending peripherally around said water passages and being spaced laterally outward of said inner rib by a gap through which said water passages extend.

2. The invention according to claim 1 comprising an inner groove formed in one of said facing surfaces and extending peripherally around said exhaust passage and generally conforming to the shape of and receiving said inner rib of said shaped O-ring seal therein, an outer groove in one of said facing surfaces and extending peripherally around said water passages and generally conforming to the shape of and receiving said outer rib of said shaped O-ring seal therein, said ribs extending beyond said grooves and being deformed upon mating of said facing surfaces to form a tight seal therebetween and isolate water between said inner and outer ribs.

3. The invention according to claim 2 wherein said grooves are formed in the same said facing surface.

4. The invention according to claim 3 comprising one or more cross-ribs extending integrally between said inner and outer ribs to support one from the other as a unitary member for placement in said grooves, and comprising one or more cross-grooves each extending between said inner and outer grooves and generally conforming to and receiving a respective said cross-rib therein.

5. The invention according to claim 2 wherein said exhaust elbow is mounted to said exhaust manifold by a plurality of bolts extending through said facing surfaces, and wherein said outer rib of said shaped O-ring seal is shaped to extend laterally inwardly of a designated set of one or more said bolts to direct and limit water flow at said facing surfaces along a path laterally inward of said set of bolts to isolate the latter from water in said water passages.

6. The invention according to claim 5 wherein said bolts of said set are generally peripherally aligned with said peripheral water passages, and wherein said outer rib is curved to extend laterally inwardly of each said bolt of said set.

7. The invention according to claim 6 wherein said outer rib at each said bolt of said set has a first portion extending toward the respective said bolt, a second portion extending from said first portion and convexly curved adjacent said bolt, a third portion extending from said second portion and concavely curved adjacent said bolt, a fourth portion extending from said third portion and convexly curved adjacent said bolt, and fifth portion extending from said fourth portion and away from said bolt.

8. The invention according to claim 7 wherein said inner rib has a convexly curved portion opposite said bolt, and wherein said third portion of said outer rib curves concavely inwardly toward said convexly curved portion of said inner rib.

9. The invention according to claim 8 wherein said convexly curved portion of said inner rib and said concavely curved third portion of said outer rib are spaced by a lateral gap therebetween communicating with water passages on both peripheral sides thereof.

10. The invention according to claim 8 wherein said first and fifth portions of said outer rib extend generally at right angles to each other.

11. The invention according to claim 2 wherein said exhaust elbow is mounted to said exhaust manifold by a plurality of bolts extending through said facing surfaces, a designated set of one or more said bolts being generally peripherally aligned with said peripheral water passages, and comprising a set of one or more pairs of cross-ribs, one pair for each said bolt of said set, each pair extending between said inner and outer ribs and being spaced by a gap therebetween receiving and respective said bolt and surrounding said bolt to isolate said bolt from water in said water passages.

12. The invention according to claim 11 wherein said inner and outer ribs extend substantially straight and parallel to each other at said bolt and on opposite lateral sides thereof.

13. The invention according to claim 12 wherein said cross-ribs extend substantially straight and parallel to each other and substantially at right angles to said inner and outer ribs, such that said inner and outer ribs and said cross-ribs form a substantially rectangular shaped enclosure around said bolt.

14. The invention according to claim 2 wherein said exhaust elbow is mounted to said exhaust manifold by a plurality of bolts extending through said facing surfaces, said bolts being generally peripherally aligned with said peripheral water passages, and wherein said outer rib of said shaped O-ring seal is shaped to extend laterally inwardly of a designated first set of one or more said bolts to direct and limit water flow at said facing surfaces along a path laterally inwardly of said bolts of said first set to isolate the latter from said water passages, and comparing a set of one or more pairs of cross-ribs, one pair for each bolt of a second set of one or more said bolts, each pair of cross-ribs extending between said inner and outer ribs and being spaced by a gap therebetween receiving the respective said bolt of said second set and surrounding said last mentioned bolt to isolate same from water in said water passages.

15. The invention according to claim 14 wherein said inner rib has a convexly curved portion opposite each said bolt of said first set, and wherein said outer rib at each said bolt of said first set has a first portion extending toward the respective said bolt, a second portion extending from said first portion and convexly curved adjacent said last mentioned bolt, a third portion extending from said second portion and concavely curved adjacent said last mentioned bolt, a fourth portion extending from said third portion and convexly curved adjacent said last mentioned bolt, and fifth portion extending from said fourth portion and away from said last mentioned bolt, and wherein said third portion of said outer rib curves concavely inwardly toward said convexly curved portion of said inner rib.

16. In a marine drive having an exhaust elbow and an exhaust pipe each having a central exhaust passage surrounded by a plurality of peripheral water passages for cooling exhaust gas in said exhaust passage, said exhaust elbow and said exhaust pipe having facing surfaces mating with each other, a resilient, shaped O-ring seal between said facing surfaces, said shaped O-ring seal having an inner peripheral rib extending peripherally around said exhaust passage and generally conforming to the shape thereof and being spaced laterally between said exhaust passage and said water passages, said shaped O-ring seal having an outer peripheral rib extending peripherally around said water passages and being spaced laterally outward of said inner rib by a gap through which said water passages extend.

17. The invention according to claim 16 comprising an inner groove formed in one of said facing surfaces and extending peripherally around said exhaust passage and generally conforming to the shape of and receiving said inner rib of said shaped O-ring seal therein, an outer groove in one of said facing surfaces and extending peripherally around said water passages and generally conforming to the shape of and receiving said outer rib of said shaped O-ring seal therein, said ribs extending beyond said grooves and being deformed upon mating of said facing surfaces to form a tight seal therebetween and isolate water between said inner and outer ribs.

18. The invention according to claim 17 wherein said grooves are formed in the same said facing surface.

19. The invention according to claim 18 comprising one or more cross-ribs extending integrally between said inner and outer ribs to support one from the other as a unitary member for placement in said grooves, and comprising one or more cross-grooves each extending between said inner and outer grooves and generally conforming to and receiving a respective said cross-rib therein.

20. The invention according to claim 17 wherein said exhaust pipe is mounted to said exhaust elbow by a plurality of bolts extending through said facing surfaces, and wherein said outer rib of said shaped O-ring seal is shaped to extend laterally inwardly of said bolts to direct and limit water flow at said facing surfaces along a path laterally inward of said bolts to isolate the latter from water in said water passages.

21. The invention according to claim 20 wherein said bolts are generally peripherally aligned with said water passages, and wherein said outer rib is curved to extend laterally inwardly of each said bolt.

22. The invention according to claim 21 wherein said outer rib at each said bolt has a first portion extending toward the respective said bolt, a second portion extending from said first portion and convexly curved adjacent said bolt, a third portion extending from said second portion and concavely curved adjacent said bolt, a fourth portion extending from said third portion and convexly curved adjacent said bolt, and fifth portion extending from said fourth portion and away from said bolt.

23. The invention according to claim 22 wherein said inner rib curves toward said bolt, and wherein said third portion of said outer rib curves concavely inwardly toward said inner rib.

24. The invention according to claim 23 wherein said inner rib and said concavely curved third portion of said outer rib are spaced by a lateral gap therebetween communicating with water passages on both peripheral sides thereof.

25. The invention according to claim 23 wherein said first and fifth portions of said outer rib extend generally at right angles to each other.

26. In a marine drive having an exhaust manifold, and exhaust elbow, and an exhaust pipe each having a central exhaust passage surrounded by a plurality of peripheral water passages for cooling exhaust gases in said exhaust passage, said exhaust manifold and said exhaust elbow having facing surfaces mating with each other, said exhaust elbow and said exhaust pipe having facing surfaces mating with each other, a first resilient, shaped O-ring seal between said facing surfaces of said exhaust manifold and said exhaust elbow, a second resilient, shaped O-ring seal between said facing surfaces of said exhaust elbow and said exhaust pipe, said first shaped O-ring seal having an inner peripheral rib extending peripherally around said exhaust passage and generally conforming to the shape thereof and being spaced laterally between said exhaust passage and said water passages, said first shaped O-ring seal having an outer peripheral rib extending peripherally around said water passages and being spaced laterally outward of said inner rib by a gap through which said water passages extend, said second shaped O-ring seal having an inner peripheral rib extending peripherally around said exhaust passage and generally conforming to the shape thereof and being spaced laterally between said exhaust passage and said water passages, said second shaped O-ring seal having an outer peripheral rib extending peripherally around said water passages and being spaced laterally outward of said inner rib of said second shaped O-ring seal by a gap through which said water passages extend.

27. The invention according to claim 26 comprising a first inner groove formed in one of said facing surfaces of said exhaust manifold and said exhaust elbow and extending peripherally around said exhaust passage and generally conforming to the shape of and receiving said inner rib of said first shaped O-ring seal therein, a first outer groove in one of said facing surfaces of said exhaust manifold and said exhaust elbow and extending peripherally around said water passages and generally conforming to the shape of and receiving said outer rib of said first shaped O-ring seal therein, said inner and outer ribs of said first shaped O-ring seal extending beyond said first and second grooves and being deformed upon mating of said facing surfaces of said exhaust manifold and said exhaust elbow to form a tight seal therebetween and isolate water between said inner and outer ribs of said first shaped O-ring seal, a second inner groove formed in one of said facing surfaces of said exhaust elbow and said exhaust pipe and extending peripherally around said exhaust passage and generally conforming to the shape of and receiving said inner rib of said second shaped O-ring seal therein, a second outer groove in one of said facing surfaces of said exhaust elbow and said exhaust pipe and extending peripherally around said water passages and generally conforming to the shape of and receiving said outer rib of said second shaped O-ring seal therein, said inner and outer ribs of said second shaped O-ring seal extending beyond said second inner and outer grooves and being deformed upon mating of said facing surfaces of said exhaust elbow and said exhaust pipe to form a tight seal therebetween and isolate water between said inner and outer ribs of said second shaped O-ring seal.

28. The invention according to claim 27 wherein said first inner and outer grooves are formed in the same said facing surface of said exhaust manifold and said exhaust elbow, and wherein said second inner and outer grooves are formed in the same said facing surface of said exhaust elbow and said exhaust pipe.

29. The invention according to claim 28 comprising a first set of one or more cross-ribs extending integrally between said inner and outer ribs of said first shaped O-ring seal to support one from the other as a unitary member for placement in said first inner and outer grooves, and comprising a first set of one or more cross-grooves each extending between said first inner and outer grooves and generally conforming to the receiving a respective said cross-rib of said first set therein, a second set of one or cross-ribs extending integrally between said inner and outer ribs of said second shaped O-ring seal to support one from the other as a unitary member for placement in said second inner and outer grooves, a second set of one or more cross-grooves each extending between said second inner and outer grooves and generally conforming to and receiving a respective said cross-rib of said second set therein.

30. The invention according to claim 27 wherein said exhaust elbow is mounted to said exhaust manifold by a first set of a plurality of bolts extending through said facing surfaces of said exhaust manifold and said exhaust elbow, and wherein said outer rib of said first shaped O-ring seal is shaped to extend laterally inwardly of a designated subset of one or more said bolts to direct and limit water flow at said facing surfaces of said exhaust manifold and said exhaust elbow along a path laterally inward of said bolts of said subset of said first set to isolate the latter from water in said water passages, and wherein said exhaust pipe is mounted to said exhaust elbow by a second set of a plurality of bolts extending through said facing surface of said exhaust pipe and said exhaust elbow, and wherein said outer rib of said second shaped O-ring seal is shaped to extend laterally inwardly of said bolts of said second set to direct and limit water flow at said facing surfaces of said exhaust elbow and said exhaust pipe along a path laterally inward of said bolts of said second set to isolate the latter from water in said passages.

31. The invention according to claim 30 wherein said bolts of said subset of said first set are generally peripherally aligned with said peripheral water passages, said outer rib of said first shaped O-ring seal is curved to extend laterally inwardly of each said bolt of said subset, said second set of bolts are generally peripherally aligned with said peripheral water passages, said outer rib of said second shaped O-ring seal is curved to extend laterally inwardly of each said bolt of said second set.

32. The invention according to claim 31 wherein said outer rib of said first shaped O-ring seal at each said bolt to said subset of said first set has a first portion extending toward the respective said bolt, a second portion extending from said first portion and convexly curved adjacent said last mentioned bolt, a third portion extending from said second portion and concavely curved adjacent said last mentioned bolt, a fourth portion extending from said third portion and convexly curved adjacent said last mentioned bolt, and fifth portion extending from said fourth portion and away from said last mentioned bolt, said outer rib of said second shaped O-ring seal at each said bolt of said second set has a first portion extending toward respective said bolt, a second portion extending from said last mentioned first portion and convexly curved adjacent said last mentioned bolt, a third portion extending from said last mentioned second portion and concavely curved adjacent said last mentioned bolt, a fourth portion extending from said last mentioned third portion and convexly curved adjacent said last mentioned bolt, and a fifth portion extending from said last mentioned fourth portion and away from said last mentioned bolt.

33. The invention according to claim 32 wherein said inner rib of said first shaped O-ring seal has a convexly curved portion opposite the respective said bolt of said subset of said first set, said third portion of said outer rib of said first shaped O-ring seal curves concavely inwardly toward said convexly curved portion of said inner rib of said first shaped O-ring seal said inner rib of said second shaped seal curves toward the respective said bolt of O-ring said second set, said third portion of said outer rib of said second shaped O-ring seal curves concavely inwardly toward said inner rib of said second shaped O-ring seal.

34. The invention according to claim 33 wherein said convexly curved portion of said inner rib of said first shaped O-ring seal and said concavely curved third portion of said outer rib of said first shaped O-ring seal are spaced by a lateral gap therebetween communicating with water passages on both peripheral sides thereof, said inner rib of said second shaped O-ring seal and said concavely curved third portion of said outer rib of said second shaped O-ring seal are spaced by lateral gap therebetween communicating with water passages on both peripheral sides thereof.

35. The invention according to claim 33 wherein said first and fifth portions of said outer rib of said first shaped O-ring seal extend generally at right angles to each other, and said first and fifth portions of said outer rib of said second shaped O-ring seal extend generally at right angles to each other.

36. The invention according to claim 27 wherein said exhaust elbow is mounted to said exhaust manifold by a plurality of bolts extending through said facing surfaces, a designated set of one or more said bolts being generally peripherally aligned with said peripheral water passages, and comprising a set of one or more pairs of cross-ribs, one pair for each said bolt of said set, each pair extending between said inner and outer ribs of said first shaped O-ring seal and being spaced by a gap therebetween receiving the respective said bolt and surrounding said last mentioned bolt to isolate same from water in said water passages.

37. The invention according to claim 36 wherein said inner and outer ribs of said first shaped O-ring seal extend substantially straight and parallel to each other at said last mentioned bolt and on opposite lateral sides thereof.

38. The invention according to claim 37 wherein said cross-ribs extend substantially straight and parallel to each other and substantially at right angles to said inner and outer ribs of said first shaped O-ring seal, such that said inner and outer ribs of said first shaped O-ring seal and said cross-ribs form a substantially rectangular shaped enclosure around said last mentioned bolt.

39. The invention according to claim 27 wherein said exhaust elbow is mounted to said exhaust manifold by a first set of plurality of bolts extending through said facing surfaces of said exhaust elbow and said exhaust manifold, said first set comprising first and second subsets, and wherein said outer rib of said first shaped O-ring seal is shaped to extend laterally inwardly of said bolts of said first subset of said first set to direct and limit water flow at said facing surfaces along a path laterally inward of said bolts of said first subset of said first set to isolate the latter from water in said water passages, a set of one or more pairs of cross-ribs, one pair for each bolt of said second subset of said first set, each pair extending between said inner and outer ribs of said first shaped O-ring seal and being spaced by a gap therebetween receiving the respective said bolt and surrounding said last mentioned bolt to isolate same from water in said water passages, and wherein said exhaust pipe is mounted to said exhaust elbow by a second set of a plurality of bolts extending through said facing surfaces of said exhaust pipe and said exhaust elbow, said outer rib of said second shaped O-ring seal is shaped to extend laterally inwardly of said bolts of said second set to direct and limit water flow at said facing surfaces of said exhaust elbow and said exhaust pipe along a path laterally inward of said bolts of said second set to isolate the latter from water in said water passages.

40. The invention according to claim 39 wherein said inner rib of said first shaped O-ring seal has a convexly curved portion opposite the respective said bolt of said first subset of said first set, said outer rib of said first shaped O-ring seal at each said bolt of said first subset of said first set has a first portion extending toward the respective said bolt, a second portion extending from said first portion and convexly curved adjacent said last mentioned bolt, a third portion extending from said second portion and concavely curved adjacent said last mentioned bolt, a fourth portion extending from said third portion and convexly curved adjacent said last mentioned bolt, and a fifth portion extending from said fourth portion and away from said last mentioned bolt, said third portion of said outer rib of said first shaped O-ring seal curves concavely inwardly toward said convexly curved portion of said inner rib of said first shaped O-ring seal, said inner rib of said second shaped O-ring seal curves toward the respective said bolt of said second set, said outer rib of said second shaped O-ring seal at the respective said bolt of said second set has a first portion extending toward the respective said bolt, a second portion extending from said last mentioned first portion and convexly curved adjacent said last mentioned bolt, a third portion extending from said last mentioned second portion and concavely curved adjacent said last mentioned bolt, a fourth portion extending from said last mentioned third portion and convexly curved adjacent said last mentioned bolt, and fifth portion extending from said last mentioned fourth portion and away from said last mentioned bolt, said third portion of said outer rib of said second shaped O-ring seal curves concavely inwardly toward inner rib of said second shaped O-ring seal.

41. The invention according to claim 40 wherein said convexly curved portion of said inner rib of said first shaped O-ring seal and said concavely curved third portion of said outer rib of said first shaped O-ring seal are spaced by a lateral gap therebetween communicating with water passages on both peripheral sides thereof, said inner and outer ribs of said first shaped O-ring seal extend substantially straight and parallel to each other at each respective said bolt of said second subset of said first set and on opposite lateral sides thereof, said inner rib of said second shaped O-ring seal and concavely curved third portion of said outer rib of said second shaped O-ring seal are spaced by a lateral gap therebetween communicating with passages on both peripheral sides thereof.

* * * * *

UNITED STATES PATENT AND TRADEMARK OFFICE
CERTIFICATE OF CORRECTION

PATENT NO. : 4,866,934

DATED : September 19, 1989

INVENTOR(S) : DENNIS H. LINDSTEDT

Page 1 of 2

It is certified that error appears in the above-identified patent and that said Letters Patent is hereby corrected as shown below:

Claim 1, col. 4, line 4, after "having" delete "and" and substitute therefore -- an --; claim 11, col. 5, line 12, delete "and" and substitute therefore -- the --; claim 14, col. 5, line 35, delete "comparing" and substitute therefore -- comprising"; claim 15, col. 5, line 52, after "and" insert -- a --; claim 26, col. 6, line 60, delete "and" and substitute therefore -- an --; claim 29, col. 7, line 68, delete "the" and substitute therefore -- and --; claim 30, col. 8, line 23, delete "surface" and substitute therefore -- surfaces --; claim 30, col. 8, line 30, after "said" insert -- water --; claim 32, col. 8, line 42, delete "to" and substitute therefore -- of --; claim 32, col. 8, line 49, after "and" insert -- a --; claim 32, col. 8, line 53, after "toward" insert -- the --; claim 33, col. 9, line 1, after "seal" insert -- , --; claim 33, col. 9, line 2, after "shaped" insert -- O-ring --; claim 33, col. 9, line 3, after "of" delete

UNITED STATES PATENT AND TRADEMARK OFFICE
CERTIFICATE OF CORRECTION

PATENT NO. : 4,866,934

DATED : September 19, 1989

INVENTOR(S) : DENNIS H. LINDSTEDT

It is certified that error appears in the above-identified patent and that said Letters Patent is hereby corrected as shown below:

"O-ring"; claim 39, col. 9, line 50, after "of" (first occurrence) insert --a--;
claim 40, col. 10, line 42, after "and" insert -- a --; claim 41, col. 10, line 59, after "and" insert -- said --; claim 41, col. 10, line 61, after "with" insert -- water --.

Signed and Sealed this

Twenty-sixth Day of February, 1991

Attest:

HARRY F. MANBECK, JR.

*Attesting Officer*  *Commissioner of Patents and Trademarks*